United States Patent [19]

Mir et al.

[11] Patent Number: 5,317,446

[45] Date of Patent: May 31, 1994

[54] ELECTROOPTIC DEVICE FOR SCANNING USING DOMAIN REVERSED REGIONS

[75] Inventors: Jose M. Mir, Webster, N.Y.; Daniel Stancil, Mars; Tuviah E. Schlesinger, Mt. Lebanon, both of Pa.

[73] Assignee: Eastman Kodak Company, Rochester, N.Y.

[21] Appl. No.: 953,460

[22] Filed: Sep. 29, 1992

[51] Int. Cl.[5] .............................................. G02B 1/32
[52] U.S. Cl. ..................... 359/296; 359/298; 359/315
[58] Field of Search ................. 359/290, 296, 298, 315

[56] References Cited

U.S. PATENT DOCUMENTS

| | | | |
|---|---|---|---|
| 4,614,408 | 9/1986 | Mir et al. | 350/388 |
| 4,740,265 | 4/1988 | Bierlein et al. | 156/624 |
| 4,765,703 | 8/2388 | Suzuki et al. | 350/96 |
| 4,866,406 | 9/1989 | Minakata et al. | 359/315 |
| 4,902,088 | 2/1990 | Jain et al. | 350/96.14 |
| 4,973,121 | 11/1990 | Brophy et al. | 350/96 |
| 4,995,689 | 2/1991 | Sarraf | 350/96.14 |
| 5,028,107 | 7/1991 | Bierlein et al. | 350/96.12 |
| 5,036,220 | 7/1991 | Byer et al. | 307/427 |
| 5,071,232 | 12/1991 | Kato et al. | 359/315 |

FOREIGN PATENT DOCUMENTS 212743 10/1985 Japan ............................ 359/298

OTHER PUBLICATIONS

Lotspeich, J. F.;IEEE Spectrum, Feb. 1968, pp. 45–52
Spillman, W. B.;Optics Letters, vol. 8 No. 9 (Sep. 1983), pp. 497–498.
Fowler, V. J.;Applied Optics, vol. 5 No. 10 (Oct. 1966), pp. 1675–1682.

Primary Examiner—Edward K. Look
Assistant Examiner—F. Daniel Loper
Attorney, Agent, or Firm—Raymond L. Owens

[57] ABSTRACT

A scanning device having: (i) an electrooptic planar waveguide or bulk material capable of propagating light beams with minimum beam distortion, (ii) an electrooptic prism array defined on said electrooptic planar waveguide or bulk material, comprised of at least one pair of antiparallel-poled ferroelectric domain regions and, (iii) control means to apply a spatially uniform electric field throughout said electrooptic prism array using a pair of electrically-addressable continuous electrodes, so as to induce an electrically-controlled deflection to a light beam propagating through the device.

16 Claims, 6 Drawing Sheets

ELECTROOPTIC DEVICE FOR SCANNING USING DOMAIN REVERSED REGIONS

BACKGROUND OF THE INVENTION

1. Field of the invention

This invention relates generally to electrooptic scanners and more particularly to a monolithic electrooptic prism scanner using domain reversed regions for deflecting an incident light beam through a desired angle by applying an electric field to a body of electrooptic material.

2. Description of the Related Art

A particularly useful form of electrooptic scanner uses a series of prisms arranged in a line with alternating prisms oriented with their apexes pointing in opposite directions. A prism scanner of this type is described in Lotspeich, J. F. IEEE Spectrum, February, 1968, pp. 45–52. In his paper, Lotspeich describes the use of many identical discrete electrooptic prisms alternately inverted and arranged in a row to deflect laser beams by applying a voltage to a pair of parallel strip electrodes aligned above and beneath the iterated-prism array.

Even though discrete crystal or bulk deflectors such as the ones described by Lotspeich are useful, they are bulky and require high operating voltages. They are also expensive and difficult to integrate into systems that are manufactured in large quantities. To circumvent these disadvantages, deflectors which use planar or waveguide geometries have been developed. The field of integrated optics involves the integration of optical functions such as discrete modulators, interferometers, deflectors, and imaging elements on planar substrates. Many advantages can be realized from planar integration: compactness, multifunctionality, monolithic integration, and lower driving voltages. Planar versions of electrooptic prism deflectors have been disclosed in U.S. Pat. No. 4,614,408. Other related planar or waveguide electrooptic methods for deflecting light beams are described by Sarraf, Brophy et al., Stevens, and Makoto et al. Stevens uses arrays of electrooptic prism elements in waveguide structures, while Sarraf, Brophy, and Makoto et al. induce deflection of light beams by spatially modulating the refractive index of a waveguide.

In order to achieve electrooptically controlled prism structures in either bulk or planar format, some means for applying high electric fields must be provided. Heretofore, as shown in FIG. 1, sets of prism shaped electrodes were defined on the electrooptic material such that when properly activated, a change in the electric field is induced in the electrooptic material. It is desirable to use adjacent prism structures as shown by Lotspeich for bulk crystals, in a waveguide format in a monolithic device in order to increase the effective change in refractive index between adjacent prisms $\Delta n$, and thus the deflection angle. One difficulty inherent with this approach arises from the need to address adjacent prism electrodes on the monolithic device with voltages having opposite polarities.

As shown in FIG. 2, strong lateral electric fields are created between adjacent electrodes which can lead to electrical breakdown, the creation of inefficient tinging fields, the need for complex voltage interconnects and, in some cases, the need for bipolar voltage sources. These problems may be somewhat reduced by applying a voltage to every other prism electrode and not applying any electric field to their immediately adjacent prism regions. In order to achieve higher deflection angles, however, it is desirable to increase the effective $\Delta n$ across an interface by applying opposite electric fields between adjacent prism electrodes which are antiparallel in direction. In this case, the effective change in refractive index between adjacent prism regions with antiparallel electric fields is $2\Delta n$, twice that of the single polarity case.

Although the antiparallel field type of planar prism deflector may be used, it is prone to electrical breakdown, requires complex electrode structures and electronic interconnects, and produces inefficient tinging fields between adjacent electrodes. In some instances, the distance between adjacent electrodes may be increased to minimize breakdown and tinging fields. Unfortunately, this approach is inefficient since it does not fully utilize the electrooptic material. On the other hand, if only every other prism is activated (single polarity case), only one half the deflection angle may be achieved. This is not very desirable since the number of resolvable scanned spots is approximately proportional to the scan angle. Higher voltages may be applied to compensate for the factor of two loss in scan angle, but high speed modulation becomes increasingly more difficult and expensive as the voltage increases. Higher voltages can also lead to material breakdown, charge injection, electrode deterioration, and saturation effects.

In summary, existing electrooptic prism deflectors exhibit several shortcomings which can limit their application and utility.

SUMMARY OF THE INVENTION

An object of the present invention is to provide a simple, efficient, reliable, high resolution electrooptic scanning device which may be useful, for example, as a laser deflector. An important aspect of the present invention is to achieve a high resolution scanner which does not suffer from electrical breakdown, material breakdown, inefficient fringing fields, or complicated electrode geometries and associated interconnect requirements. Furthermore, the present invention provides a low voltage addressing scheme which uses a simple continuous electrode pair to uniformly activate an array of prism deflectors. A further important aspect of the invention is to provide a scanning device which can be fully integrated with other electrooptic devices in a planar or integrated geometry.

The present invention comprises an improved, high resolution, reliable, scanning device having: (i) an electrooptic planar waveguide or bulk material capable of propagating light beams with minimum beam distortion, (ii) an electrooptic prism array defined on said electrooptic planar waveguide or bulk material, comprised of at least one pair of antiparallel-poled ferroelectric domain regions and, (iii) control means to apply a spatially uniform electric field throughout said electrooptic prism array using a pair of electrically-addressable continuous electrodes, so as to induce an electrically-controlled deflection to a light beam propagating through the device.

The present invention is especially advantageous because it can be easily fabricated using well known linear electrooptic materials and microfabrication techniques. The device concept is also general enough to be implemented using both thin film waveguides or bulk electrooptic materials. Furthermore, waveguide based scanning devices as described in the present invention may be implemented with standard waveguide formats, e.g. thin film deposited or in-diffused. As a result of the simplified device structure, electronic drive requirements for the novel scanning device may also be relaxed.

DETAILED DESCRIPTION OF THE PREFERRED EMBODIMENT

Figure 1:
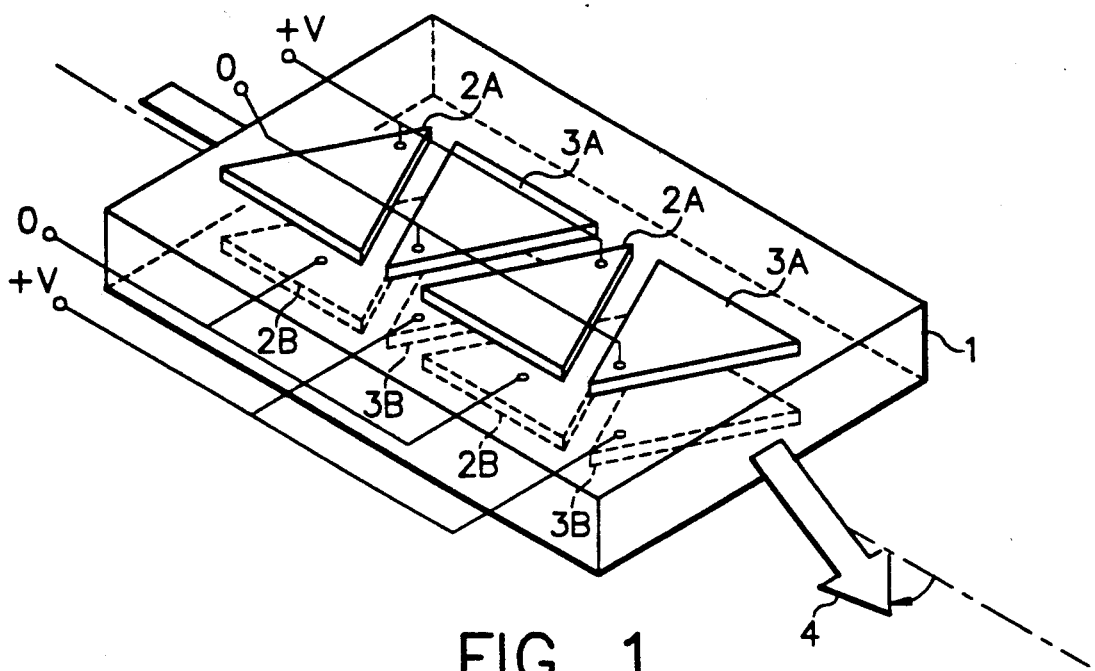
FIG. 1 is a schematic perspective view of a typical prior art electrooptic prism scanner.
Figure 2:
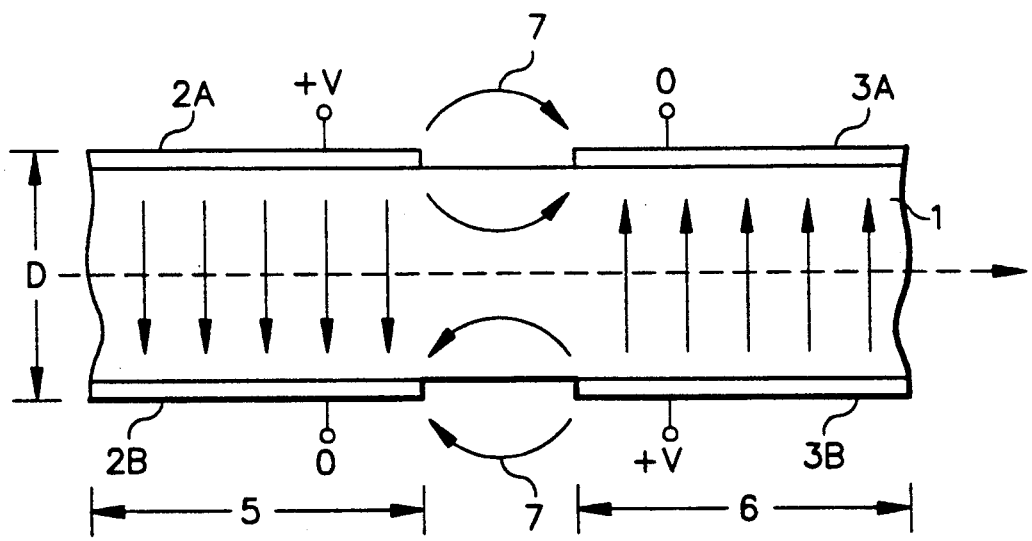
FIG. 2 is a cross sectional view of the electrooptic prism scanner of FIG. 1.

FIG. 1 shows a schematic illustration of a typical prior art electrooptic prism scanner. A set of triangular-shaped electrodes 2 and 3, are defined on both surfaces of an electrooptic crystal 1. The electrodes on one surface are designated "a" and the electrodes on the opposite surface "b". A first voltage of $+V$ is applied to all electrodes 2a, and a different voltage (e.g. 0) is applied to all electrodes 3a. Electrodes 2b and 3b are associated with 2a and 3a, respectively, and are aligned with 2a and 3a so as to create a sandwich which includes the electrooptic material. In this arrangement, electrodes 2b are addressed with the same voltage as used for 3a, whereas electrodes 3b are addressed with the same voltage as used for 2a. The resulting field pattern is shown in FIG. 2 which depicts a cross sectional view of the prior art device showing the vicinity around two adjacent electrodes. As a result of the applied voltage pattern, the electric field in the crystal 1 changes polarity between regions 5 defined by electrodes 2a, 2b and regions 6 defined by electrodes 3a, 3b. If the electrooptic material has a linear electrooptic coefficient the effective change in refractive index $\Delta n_{eff}$ induced between regions 5 and 6 is proportional to the applied voltage V.

Consequently, any light beam polarized along the direction which samples the induced $\Delta n_{eff}$, will experience a proportional refraction at each interface between regions 5 and 6. Unfortunately, although the useful electric fields in this geometry are normal to the surface of crystal 1, other fringing fields, both inside and outside 1 are also induced. These fringing fields can be very high, especially if the electrodes are closely spaced. Very high fringing fields 7 shown in FIG. 2 may induce breakdown in the air gap between adjacent electrodes and other undesirable effects within the electrooptic material mentioned earlier.

Other configurations may also be considered which replace 2b and 3b with a continuous reference (e.g. ground) electrode. Although this somewhat simplifies the electrode geometry, in order to achieve the same electric fields as in the case of FIG. 2, the voltage on 2a and 3a need to be bipolar ($+V$ and $-V$), thus creating a need for an additional voltage level. Furthermore, even higher fringing fields will exist across gaps which separate electrodes 2a and 3a. Since the voltage difference in this case will be twice that of the example shown in FIG. 2, it will increase the danger of breakdown and other aforementioned undesirable effects.

The device shown in FIGS. 1 and 2 can be used either in a "bulk" mode, where the light propagates throughout the body 1, or in a waveguide mode, where a thin waveguide layer, not shown, is formed on the surface of the body and the deflected beam 4 propagates through the layer.

Two types of electrooptic effects may be utilized for scanner applications: The first in which the index change is linearly dependent on the electric field is referred to as linear or Pockels. The second in which the index change is quadratically dependent on the electric field is referred to as quadratic or Kerr. In either case, an electric field induces a change in refractive index across an interface, thereby changing the angle of refraction of a light beam at said interface. For a linear material, the change in refractive index, $\Delta n$, may be simply given by:

$$\Delta n = \tfrac{1}{2} n^3 r E,$$

where n is the unperturbed refractive index of the crystal, r is the linear electrooptic coefficient and E is the magnitude of the applied electric field. The above expression is further complicated by the fact that electrooptic materials tend to be anisotropic and, consequently, the electrooptic coefficient is a tensor quantity.

Many useful electrooptic materials are ferroelectric. They exhibit a residual polarization which can be induced electrically by subjecting the material to a high field. Lithium niobate crystals, for example, are typically poled along the thickness of the crystal before they are used for device fabrication. In these linear electrooptic c materials, the sign of the electrooptic coefficient, r, and hence the sign of $\Delta n$ depend on the direction of the applied electric field relative to the poling direction.

The refraction angle at an interface between two adjacent regions with different refractive indices will vary according to the familiar Snell's Law, $$n_1 \sin(\phi_1) = n_2 \sin(\phi_2),$$

where $n_1$ and $n_2$ are refractive indices in media 1 and 2 and $\phi_1$, $\phi_2$ are the corresponding angles of the light beams in media 1 and 2, respectively, measured relative to the surface normal. Although the refraction of light across interfaces may be more elegantly and generally described by analyzing the phase difference induced by refractive index discontinuities across media interfaces, Snell's law will be adequate for our purposes.

Index discontinuities commonly occur when two dissimilar media are in contact with each other for example at an air-water interface. In electrooptic materials, index changes can be induced electrically by applying different electric fields in adjacent regions. Since the fields may be controlled by means of electrodes, the angle of refraction may be modulated in response to a voltage signal. This principle is widely used for the design and fabrication of electrooptic deflectors as known in the art.

Numerous electrooptic materials have been described in the literature for use in electrooptic scanner applications. Potassium dihydrogen phosphate (KDP), lanthanum-modified lead zirconate titanate (PLZT), potassium titanyl phosphate (KTP), potassium tantalate phosphate (KTN), barium titanate (BaTiO$_3$), lithium niobate (LiNbO$_3$), lithium tantalate (LiTaO$_3$), calcium sulfide (Cd$_S$), and gallium arsenide (GaAs) have all been considered or used for electrooptic beam deflection. In fact, any material which exhibits electrooptic properties can be in principle be considered for electrooptic scanning applications.

Figure 3:
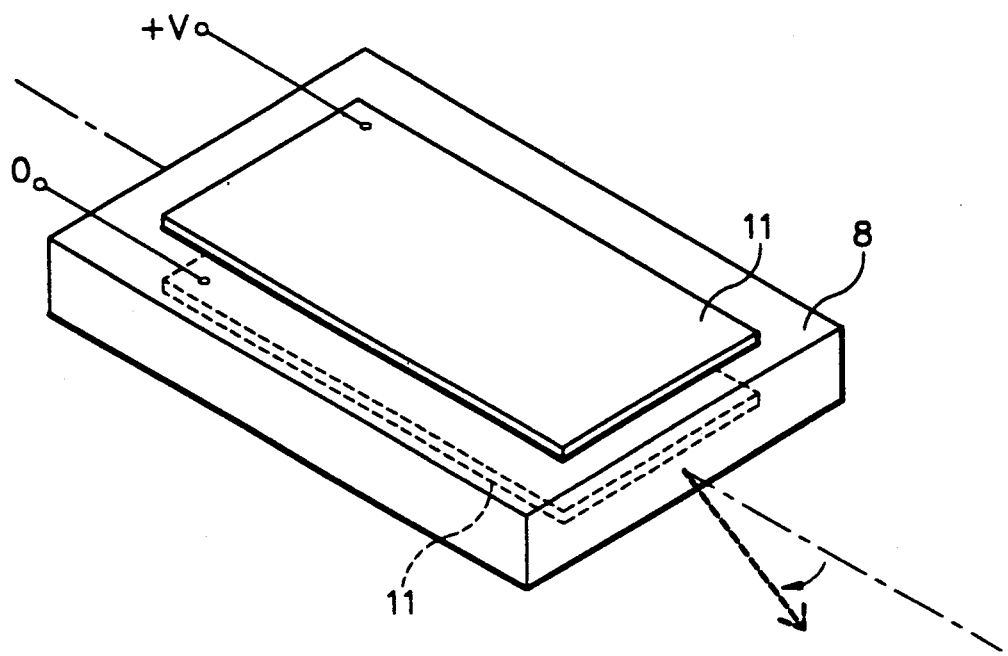
FIG. 3 is a schematic and perspective view illustrating a preferred embodiment of the electrooptic prism scanning device in accordance with the present invention.
Figure 4:
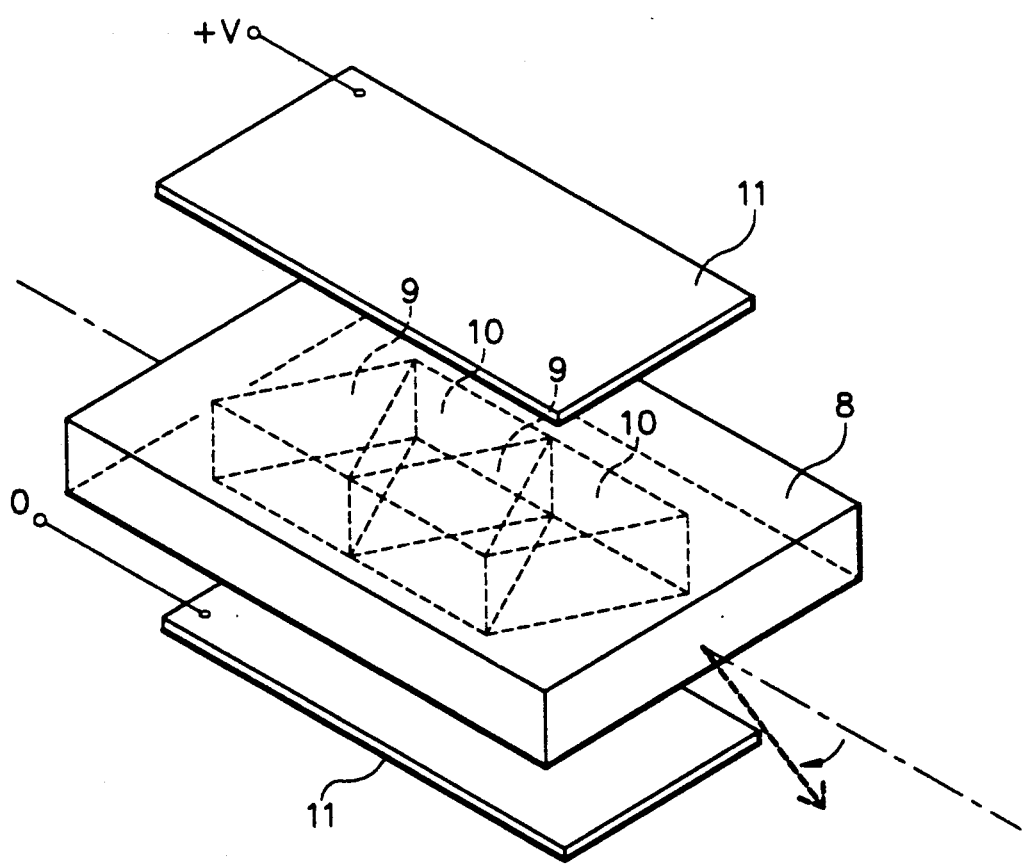
FIG. 4 is an exploded view of the scanning device of FIG. 3.

Referring to FIGS. 3 and 4, a preferred embodiment of the present invention will now be described. An electrooptic crystal 8 which was originally uniformly poled in one direction normal to the crystal surface contains two sets of triangular shaped regions 9 and 10. The regions are created in the crystal by electrically poling regions 9 in the opposite direction as of the remaining part of 8. Regions depicted by 10 are poled in the same direction as the original crystal 8, therefore adjacent regions 9 and 10 are poled in an antiparallel fashion. Consequently, an electric field applied along the surface normal direction by applying a potential to electrodes 11 will induce changes in refractive index of opposite sign in regions 9 and 10. Assuming a constant voltage V, the effective change in refractive index across the interface between regions 9 and 10 equals, $$\Delta n_{eff} = n^3 r V/d,$$

where V is the applied voltage across 8 and d is the crystal thickness.

Since a constant electric field is required to induce the change in index across the prism array, a voltage signal may be applied across a pair of continuous electrodes 11 which completely overlap the area defined by the triangular array. The scanning device may be therefore activated by simply applying a voltage V using electrode pair 11.

Figure 5:
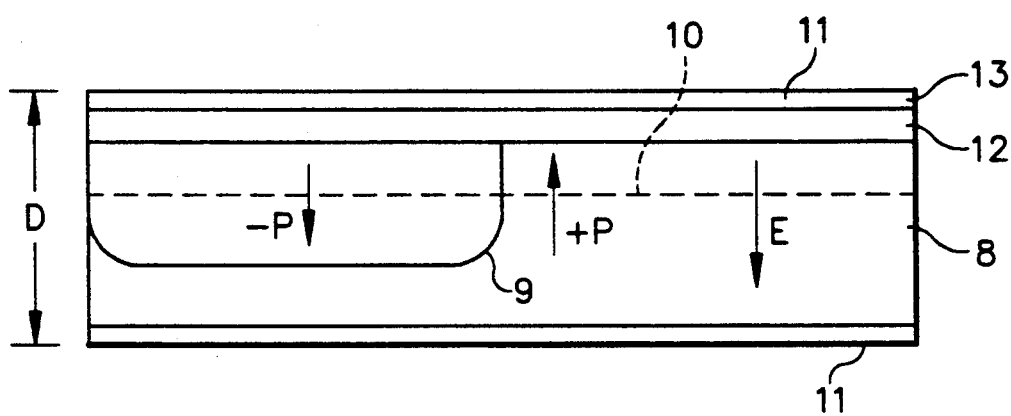
FIG. 5 is a cross sectional view showing the periodically poled domain regions in the electrooptic material and the waveguiding region.

FIG. 5 shows a cross sectional view of the electrooptic deflector shown in FIG. 3 around the vicinity between adjacent antiparallel poled regions 9 and 10. A voltage applied to electrodes 11 creates a uniform electric field of magnitude E throughout the entire electrooptic region. Preferably a region 12 acts as a waveguide region and confines the light beam within this region. The waveguide region may be formed by indiffusion, proton exchange, deposition of a thin film or any other standard technique. A necessary condition for the waveguide region is that its refractive index be higher than the refractive index of the underlying part of 8 and that it be thick enough to support at least one waveguide mode. An optional buffer layer 13 is preferably provided if waveguide 12 is used, to minimize optical losses at the electrode 11/waveguide 12 interface. Buffer layer 13 should have refractive index lower than that of the waveguide region 12 in order to satisfy the criteria needed for achieving a coupled mode in wave guide 13.

The electrooptic material 8 preferably has parallel sides and is of excellent optical quality to avoid losses. Lack of parallelism between wafer sides will induce changes in the applied electric field throughout the device, and produce unwanted distortion of the propagating beam. Specific values of required parallelism between the two sides of the wafer will be determined by the specific application. Preferably, parallelism should be better than 1%, more preferably better than 0.1% of the total wafer thickness. Useful wafer thickness will depend on the material and the application, but is typically in the range of 10 to 1000 microns, preferably 20 to 500 microns. Thicker wafers will require much higher driving voltages since the applied field is given approximately by V/d. Thinner wafers will be hard to handle using standard wafer processing techniques.

Any linear electrooptic material which can be electrically poled may in principle be used. Suitable are such electrooptic materials as: Potassium dihydrogen phosphate (KDP), linear compositions of lanthanum-modified lead zirconate titanate (PLZT), potassium titanyl phosphate (KTP), potassium tantalate phosphate (KTN), barium titanate (BaTiO$_3$), lithium niobate (LiNbO$_3$), and lithium tantalate (LiTaO$_3$). Preferred materials include LiTaO$_3$, LiNbO$_3$, and KTP.

There are several techniques available to create reversed poled regions 9. Polarization reversal may be achieved by temporarily applying large local electric fields to the crystal 8 using prism shaped electrodes. This must be done before electrodes 11 are applied to the crystal 8 and any residual electrode structure from this process must be removed after the localized poling is accomplished. In some cases it may desirable to reverse pole the material at temperatures above room temperatures. This process generally tends to reduce the magnitude of the field necessary to reverse the polarization.

Other techniques to reverse the polarization of electrooptic crystals involve locally modifying the crystal composition with a dopant which lowers the Curie temperature of the material. This has been demonstrated by Byer et al. in efforts to achieve periodically poled LiNbO$_3$ for quasi phase matched second harmonic generation. Similar approaches have been successfully used for LiTaO$_3$, KTP, and other ferroelectric crystals. Generally, the approach involves defining a pattern of the desired dopant on the surface of the crystal using conventional microfabrication techniques. The nature of the dopant depends on the specific electrooptic material. Typical examples of dopants described in the literature are Ti for LiNbO$_3$ and LiTaO$_3$ and Ba, Ca, and Sr for KTP. After the dopant is patterned in the desired geometry on the surface of the crystal, the crystal is heated to a high temperature ranging from 400 C to 1000 C in order to indiffuse the dopant into the crystal and to modify the polarization of the doped regions.

Yet another technique used to reverse the polarization of electrooptic crystals is electron beam processing. In this case, an electron beam is focused on the crystal in the pattern to be reversed. At high enough beam currents and exposure times, an intense electric field is established across the sample. The sample nucleates locally and allows for subsequent growth of antiparallel domains. Again, this technique is known and has been demonstrated for materials of interest such as LiNbO$_3$ and LiTaO$_3$.

Waveguide layer 12 may be created by indiffusing a dopant which increases the refractive index of crystal 8. This is a standard procedure used in the field of integrated optics. Waveguides can be made in LiTaO$_3$ and LiNbO$_3$, for example, using proton exchange and Ti-indiffusion as is standard practice in integrated optics technology. Impurities such as Rb, Cs, and Tl have been found effective for KTP. Other exchange processes or dopants can, of course, be used as long as they increase the refractive index of crystal 8, thus creating a waveguide. The impurities should also not significantly reduce the electrooptic coefficients of 8, since this would decrease the scanner efficiency.

Another method to create waveguide layer 12 is to deposit an electrooptic thin film on an underlying substrate. In this case, the substrate is made of a material which may or may not exhibit an electrooptic effect. The deposited waveguide 12 is electrooptic in nature, has a higher refractive index than the underlying substrate, and shows some degree of preferential orientation relative to the substrate. These conditions are required since the waveguide layer must exhibit a net noncentrosymmetric crystalline orientation for second harmonic generation and should be able to propagate coupled optical modes with minimal scattering or absorption. Preferably, waveguide 12 is an epitaxial film, able to propagate waveguide modes with low optical loss. Suitable materials for the deposited film 12, are such electrooptic materials as: potassium dihydrogen phosphate (KDP), linear compositions of lanthanum-modified lead zirconate titanate (PLZT), potassium titanyl phosphate (KTP), potassium tantalate phosphate (KTN), barium titanate (BaTiO$_3$), lithium niobate (LiNbO$_3$), and lithium tantalate (LiTaO$_3$). Preferred materials include LiTaO$_3$, LiNbO$_3$, and KTP. These materials may be deposited using standard thin film deposition methods such as RF sputtering, e-beam evaporation, laser ablation, chemical vapor deposition, molecular beam epitaxy, liquid phase epitaxy, sol gel, metallo-organic decomposition or any other suitable technique. It should be appreciated, however, that any useful linear electrooptic material may in principle be used for waveguide layer 12. Suitable materials for the substrate material which supports layer 12 include single crystal substrates such as alumina, zirconia, magnesia, strontium titanate, barium titanate, calcium titanate, calcium fluoride, strontium fluoride, barium fluoride, lithium fluoride, or any inorganic substrate capable of supporting an oriented electrooptic thin film. Silicon, gallium arsenide and other semiconducting substrates may also be used in conjunction with an intermediate epitaxial buffer layer of one or more of the oxide or fluoride compositions cited above.

The required thickness of layer 12 for both deposited and in-diffused waveguides depends on: i) the refractive index of the underlying substrate which supports the layer 12, ii) the refractive index of the waveguide material, and iii) the number and type of optical modes which will propagate along 12. For most applications, useful thicknesses for layer 12 are in the range of 2000 A to 50000 A. in some applications, it may be desirable to propagate the deflected light beam along the full wafer thickness. For this case, useful ranges follow those previously defined for crystal 8.

Buffer layer 13 may be deposited using any conventional thin film deposition method such as RF sputtering, e-beam evaporation, laser ablation, chemical vapor deposition, molecular beam epitaxy, liquid phase epitaxy, sol gel, metallo-organic decomposition, or any other suitable technique. Buffer layer 13 needs to be compatible with electrode 11 and crystal 8 and should be highly smooth. Any dielectric layer with low optical loss and lower refractive index than 12 can in principle be used. Some examples are simple oxides (e.g. oxides of Si, Ta, Al, etc.), fluorides (e.g. fluorides of Ca, Sr, Ba, Li, etc.), nitrides (e.g. Si), and any of a large selection of more complex oxides, fluorides, and nitrides which satisfy optical requirements of said layer. Useful thicknesses of layer 13 should be in the range of 500 A to 30000 A, preferably 1000 A to 10000 A. If layer 13 is too thin, the coupled mode in 12 can interact with electrode 11 and consequently induce optical loss. If layer 13 is too thick, it becomes more difficult and expensive to deposit using the conventional techniques cited above. Layer 13 should also be sufficiently thin that the fraction of the applied voltage Y dropped across this layer is negligible. Electrode layers 11 can in principle be made of any metal which exhibits good adhesion to layer 13 and crystal 8. Useful examples are Au, Cr-Au, Ti-Au, Al, Ag, Cr-Pt, Ti-Pt, Pd-Pt or any other useful metallization known in the art. It is desirable but not essential to provide a metal thick enough so as to make it compatible with common interconnection methods e.g. wire bonding, tape automated bonding, soldering, etc. The thickness range of useful electrode layers 11 is 500 A to 50000 A, preferably 1000 A to 10000 A. If electrode layers 11 are too thin, their sheet resistance increases, thus increasing switching time constants and they become mechanically more delicate. For practical reasons, very thin layers are also more difficult to connect to. On the other hand, very thick layers take longer to deposit and are wasteful of electrode material.

Figure 6:
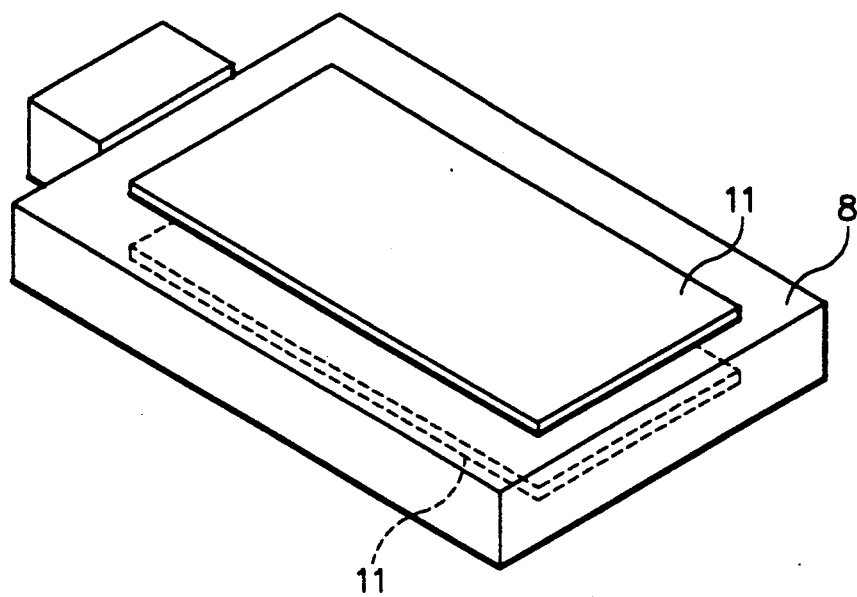
FIG. 6 is a diagrammatic view of a prism scanner in accordance with this invention showing a laser diode butt coupled to the scanner.
Figure 7:
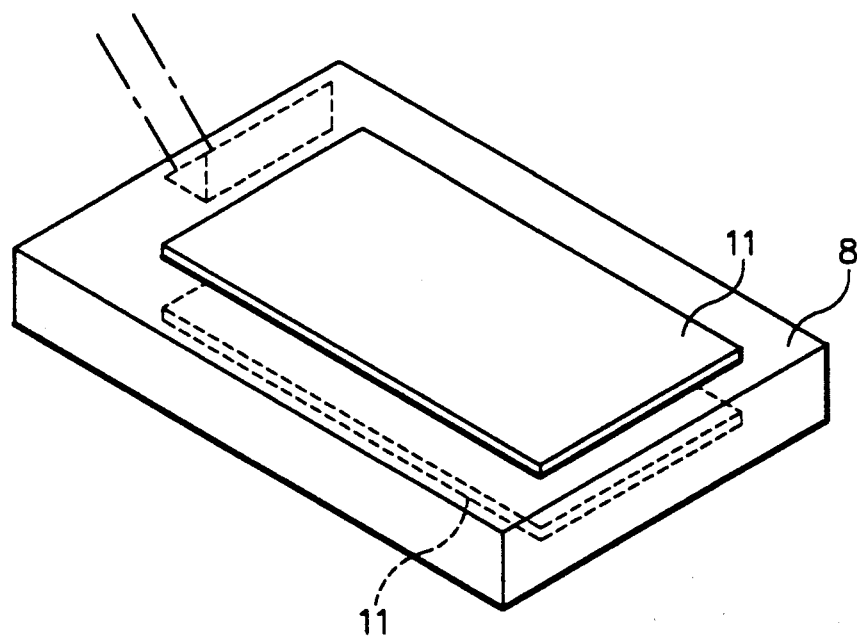
FIG. 7 shows a scanner in accordance with this invention with a prism coupler.
Figure 8:
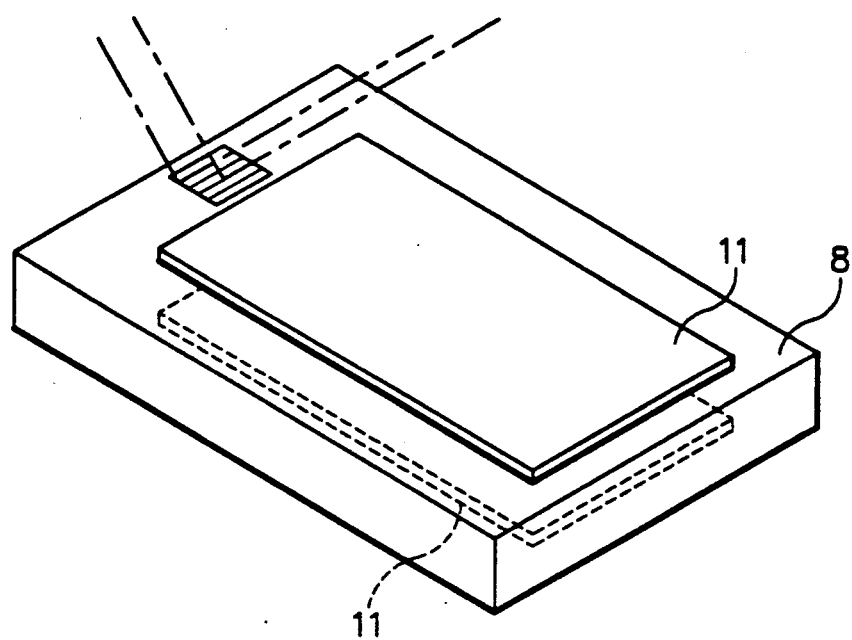
FIG. 8 shows a scanner in accordance with this invention with a grading coupler.
Figure 9:
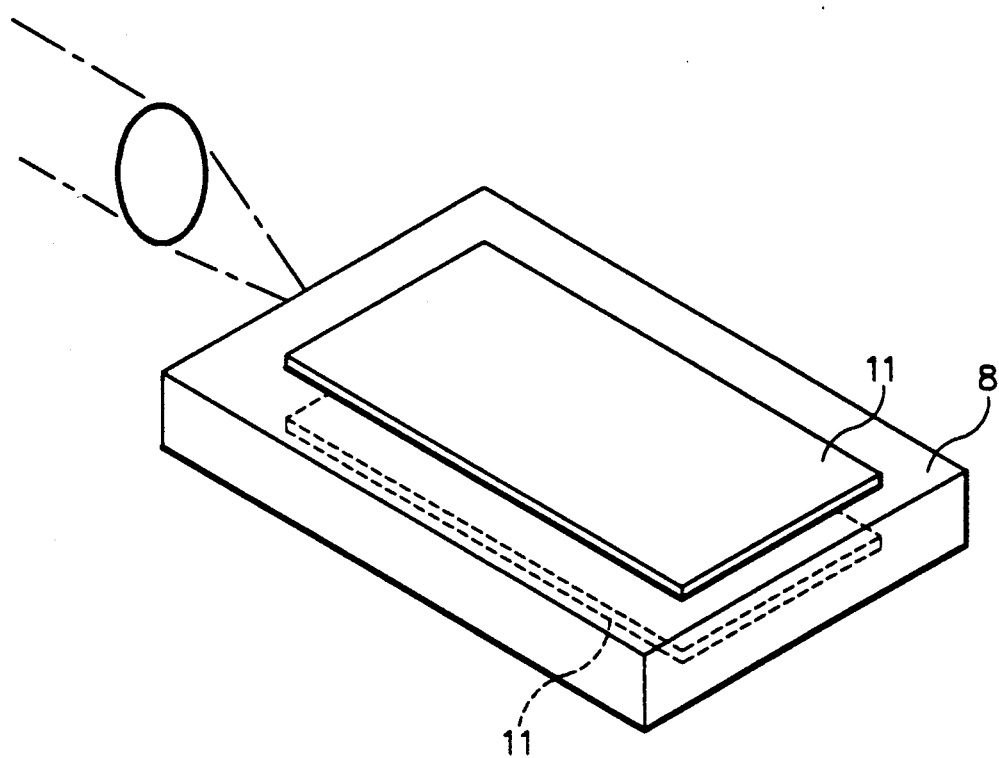
FIG. 9 shows a scanner in accordance with this invention having an end fired input coupler.

Although the present invention may be a monolithic part of a larger integrated optical circuit sometimes it may be desirable to operate the scanner as a stand alone device. In that case, it would be required to couple light in and out of the scanning device. Standard coupling techniques may be used to accomplish this such as prism coupling, as shown in FIG. 6, butt coupling, as shown in FIG. 7, grating coupling as shown in FIG. 8 or end firing as shown in FIG. 9. If butt coupling or endfiring are used, the faces of crystal 8 which input and output the light beam need to be polished to optical quality. In the case of grating coupling, input and output gratings need to be generated on the surface of the electrooptic crystal as is widely practiced in integrated optics technology.

In some cases, it may be desirable to operate the scanning device at very reduced voltages. Since the magnitude of the electric field will define what deflection angles and number of resolved spots will be achieved for a given material and device geometry, one method to decrease the drive voltage is to reduce the thickness d of the electrooptic medium between electrodes 11. The number of resolvable spots, n, for example, is given by, $$N = \pi L n^3 r V / (2d\lambda),$$

where L is the total length of the prism array, $\lambda$ is the wavelength of the light beam, and n, r, V, d are as defined above. For LiTaO$_3$, using the $r_{33}$ tensor element, the z-component of the electric field in a z-cut wafer, a relationship for N vs V may be calculated for a example for the TM polarized mode where L=1 cm and $\lambda$=424 nanometers. In this case, $r_{33}$=31×(10)^12 m/V
$\lambda$=424 nm
n=2.2

L=1 cm

Figure 10:
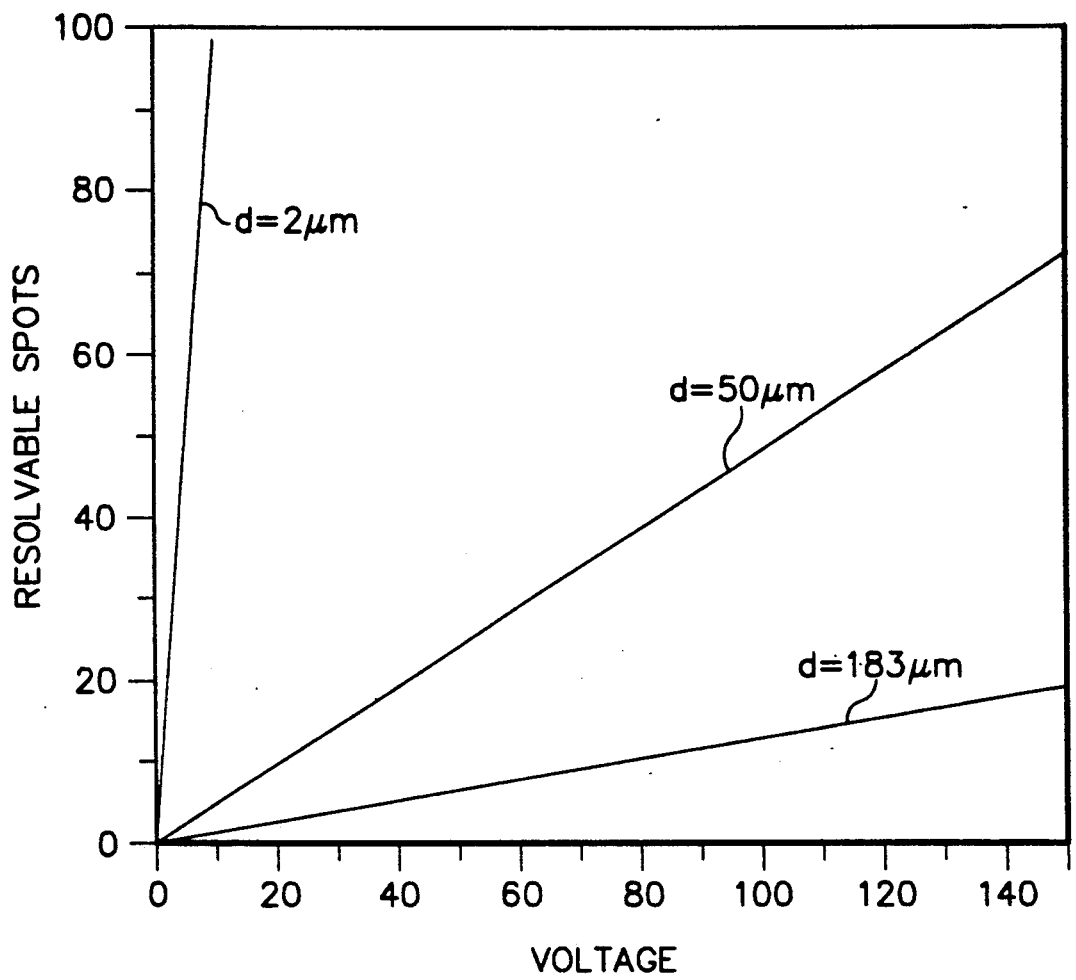
FIG. 10 shows a plot of the deflection angle vs. voltage for three specific embodiments of the present invention.

The data in FIG. 10 is plotted for values, d=2, 50, and 183 microns. The benefits of minimizing thickness d is apparent from the graph. Thickness d may be reduced by grinding or milling the wafer thickness in the region of the prism array to the desired value. Additional support around the periphery of crystal 8 may be required to minimize breakage during the handling of very thin wafers. If a deposited electrooptic waveguide film is used, thin values of d may be achieved by depositing the waveguide film on a metallic surface. The metallic surface must also be able to support subsequent epitaxial growth of the deposited waveguide layer. In order to avoid optical loss of the waveguided mode by interaction with the underlying metal surface, a dielectric buffer layer analogous to 13 may be needed between the metal and waveguide layers. In this case, the underlying metal and buffer layers must be capable of supporting oriented growth of the waveguide layer.

The number of prism pairs which may be optimally used is not very critical. In fact, for a given prism width and length L, the number of prisms does not affect the number of resolvable spots or the deflection angle. An intuitive explanation of this effect is that as the number of prism pairs decreases, their angle increases, thereby enhancing the refraction effect at each interface. As the number of prism pairs increases, their angle decreases, thereby decreasing the refraction effect at each interface. Although there may be second order effects that could enter in tills tradeoff, they are not believed to be significant. The range on the number of prism pairs is therefore rather coarse: greater than 1 pair, less than 1000, preferably greater than 1 and less than 100. In order to achieve the desired index difference, at least one pair is required; if the number of electrodes becomes very large, however, the geometry begins to tax the ability of photolithography and microfabrication process to achieve high quality, distortion-free antiparallel prism shaped domains.

One skilled in the art will appreciate that a scanner in accordance with the present invention can be modified by building a plurality of prism array structures as depicted in FIG. 4 on a single substrate. Therefore, multiple beams may be deflected simultaneously by simply applying voltage signals corresponding to each desired deflection for the respective beam. Since the angle of deflection may be independently controlled by each prism array structure, different degrees of deflection may be imparted on to the respective beams. Another obvious extension of the present invention is to deflect a plurality of beams using a single prism array structure. This approach is particularly advantageous in applications where several beams need to be deflected by precisely the same angle. Also it should be understood that in some cases, prisms with curved surfaces or other refractive geometries such as imaging elements and the like may be achieved within the scope of the present invention. It may be possible, for example to construct the variable refractive elements in the shape of imaging elements which can vary their optical properties e.g. focal length by changing the applied voltage. Any refractive geometry may be implemented by simply changing the shape of the antiparallel poled domain structure to properly implement the desired functionality.

The invention has been described in detail in reference to certain preferred embodiments. It should be appreciated that variations may be affected within the scope of the invention.

What is claimed is:

1. An improved scanning device for deflecting an incident light beam through an electronically controlled angle in response to the application of an electric field to the device comprising:
   a monolithic body including a light transmissive portion formed from electrooptic material;
   at least first and second antiparallel poled ferroelectric regions in the light transmissive portion; and
   electrode means on the body, said electrode means arranged on the body overlying the first and second antiparallel poled ferroelectric regions, so that upon the application of an electrical signal to the electrode means, an electric field is created at least partially within the light transmissive portion of the body, at least a part of each ferroelectric region being intersected by the electric field.

2. The scanning device of claim 1 in which the body is a planar body and the electrode means comprise at least a pair of electrodes one being disposed on each of two opposed surfaces of the body for creating an at least locally spatially constant electric field in the planar body, between the electrodes.

3. The scanning device of claim 2 in which said first and second antiparallel poled ferroelectric regions comprise a prism array disposed within said locally spatially constant electric field.

4. The scanning device of claim 1 also comprising means for coupling an input light beam into the light transmissive portion.

5. The scanning device of claim 1 in which said first and second antiparallel poled ferroelectric regions comprise a prism array of at least two triangular shaped regions.

6. The scanning device of claim 1 comprising means for coupling an output light beam out of the light transmissive portion.

7. The scanning device of claim 6 in which the pair of electrodes comprises a pair of continuous electrodes.

8. The scanning device of any of claims 1-7 in which the light transmissive portion comprises a thin film of electrooptic material characterized by a first index of refraction disposed on a material characterized by a second lower index of refraction.

9. The scanning device of claim 8 in which the thin film of electrooptic material has a thickness sufficient to allow the propagation of at least one low loss optical mode through the thin film.

10. The scanning device of claim 9 in which the thin film of electrooptic material comprises a layer of material including an impurity diffused into said layer.

11. The scanning device of claim 10 also comprising a layer of dielectric material between said electrode means and thin film of electrooptic material.

12. The scanning device of claim 11 in which said layer of dielectric material comprises a layer of material characterized by an index of refraction lower than the first index of refraction.

13. The scanning device of claim 9 in which the material characterized by a second lower index of refraction comprises a substrate and the thin film of electrooptic material comprises a layer of material deposited on the substrate.

14. The scanning device of claim 13 also comprising a layer of dielectric material between said electrode means and thin film of electrooptic material.

15. The scanning device of claim 14 in which said layer of dielectric material comprises a layer of material characterized by an index of refraction lower than the first index of refraction.

16. A scanning device for deflecting an incident light beam through an electronically controlled angle in response to the application of an electric field to the device comprising:
- a monolithic body including a light transmissive portion formed from electrooptic material;
- electric field generating means for creating an electric field within the light transmissive portion;
- a first region in said light transmissive portion within said electric field, characterized by an index of refraction that increases in response to said electric field; and
- a second region in said light transmissive portion within said electric field and adjacent to the first region, characterized by an index of refraction that decreases in response to said electric field;
- whereby the application of a unipolar electric field to the device increases the angle through which a light beam is deflected while passing from the first region to the second region.

* * * * *